US009509519B2

(12) United States Patent
Wang et al.

(10) Patent No.: US 9,509,519 B2
(45) Date of Patent: Nov. 29, 2016

(54) METHOD AND SYSTEM FOR MANAGING USER LOCATION INFORMATION IN A COMMUNICATION SYSTEM

(71) Applicant: AT&T Intellectual Property I, LP, Atlanta, GA (US)

(72) Inventors: Jianrong Wang, Sammamish, WA (US); Jiansong Wang, Parlin, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 582 days.

(21) Appl. No.: 14/021,786

(22) Filed: Sep. 9, 2013

(65) Prior Publication Data

US 2015/0071125 A1   Mar. 12, 2015

(51) Int. Cl.
| | |
|---|---|
| *H04L 12/28* | (2006.01) |
| *H04L 12/14* | (2006.01) |
| *H04W 4/02* | (2009.01) |
| *H04W 64/00* | (2009.01) |
| *H04L 12/24* | (2006.01) |

(52) U.S. Cl.
CPC ....... *H04L 12/1407* (2013.01); *H04L 41/0893* (2013.01); *H04W 4/02* (2013.01); *H04W 64/00* (2013.01); *H04L 12/1467* (2013.01)

(58) Field of Classification Search
CPC ................. H04W 8/20; H04L 12/14
See application file for complete search history.

(56) References Cited

U.S. PATENT DOCUMENTS

| | | | | |
|---|---|---|---|---|
| 7,607,138 B2* | 10/2009 | Donovan | ................ | G06F 9/542 709/224 |
| 8,032,112 B2 | 10/2011 | Hines et al. | | |
| 8,055,262 B1* | 11/2011 | Vu | ........................ | H04W 4/10 455/433 |
| 8,155,290 B2* | 4/2012 | Cai | ....................... | H04M 15/00 379/114.01 |
| 8,300,603 B2 | 10/2012 | Chowdhury et al. | | |
| 2005/0181758 A1* | 8/2005 | Ansamaa | ............ | H04L 12/2854 455/406 |
| 2008/0046963 A1* | 2/2008 | Grayson | ................. | H04L 12/66 726/1 |
| 2008/0123603 A1* | 5/2008 | Cai | ....................... | H04M 7/129 370/338 |
| 2008/0256251 A1* | 10/2008 | Huotari | ................... | H04L 67/16 709/229 |
| 2010/0238887 A1 | 9/2010 | Koodli et al. | | |

(Continued)

FOREIGN PATENT DOCUMENTS

EP    2613597 A1    7/2013

*Primary Examiner* — Ricky Ngo
*Assistant Examiner* — Dewanda Samuel
(74) *Attorney, Agent, or Firm* — Guntin & Gust, PLC; Robert Gingher

(57) ABSTRACT

A system that incorporates the subject disclosure may include, for example, receive a subscription from an application server where the subscription identifies a session event and/or sub-events occurring in a communication session for which the application server requests user location information, provide subscription information based on the subscription to core network nodes of the mobile communications network, receive user location information from the core network nodes responsive to a detection of a triggering event corresponding to the session event of the subscription, and provide the user location information to an IP multimedia subsystem network for delivery to the application server. Other embodiments are disclosed.

20 Claims, 7 Drawing Sheets

(56) References Cited

U.S. PATENT DOCUMENTS

| | | | | |
|---|---|---|---|---|
| 2011/0029558 | A1* | 2/2011 | Chua | H04L 65/1016 |
| | | | | 707/769 |
| 2011/0060811 | A1* | 3/2011 | Hu | H04L 12/14 |
| | | | | 709/217 |
| 2011/0208853 | A1* | 8/2011 | Castro-Castro | H04L 12/14 |
| | | | | 709/223 |
| 2011/0287793 | A1 | 11/2011 | Tenny et al. | |
| 2012/0064878 | A1* | 3/2012 | Castro Castro | H04L 12/14 |
| | | | | 455/418 |
| 2012/0072592 | A1* | 3/2012 | Lidstrom | H04L 12/5695 |
| | | | | 709/224 |
| 2012/0320801 | A1* | 12/2012 | Yang | H04L 12/14 |
| | | | | 370/259 |
| 2012/0327893 | A1 | 12/2012 | Yuan et al. | |
| 2013/0053027 | A1 | 2/2013 | Lau et al. | |

* cited by examiner

100

400

METHOD AND SYSTEM FOR MANAGING USER LOCATION INFORMATION IN A COMMUNICATION SYSTEM

FIELD OF THE DISCLOSURE

The subject disclosure relates to a method and system for managing user location information in a communication system.

BACKGROUND

Communication systems, such as a mobile communications system, can be used for providing various services, including voice, video and/or data services, and user location information can be important for next generation IP multi-media services provided by telecommunication systems As the number of users and their service requirements increase, the load on the network increases Infrastructure expansion and improvement can lessen the network load but is costly.

BRIEF DESCRIPTION OF THE DRAWINGS

Reference will now be made to the accompanying drawings, which are not necessarily drawn to scale, and wherein.

DETAILED DESCRIPTION

Figure 1:
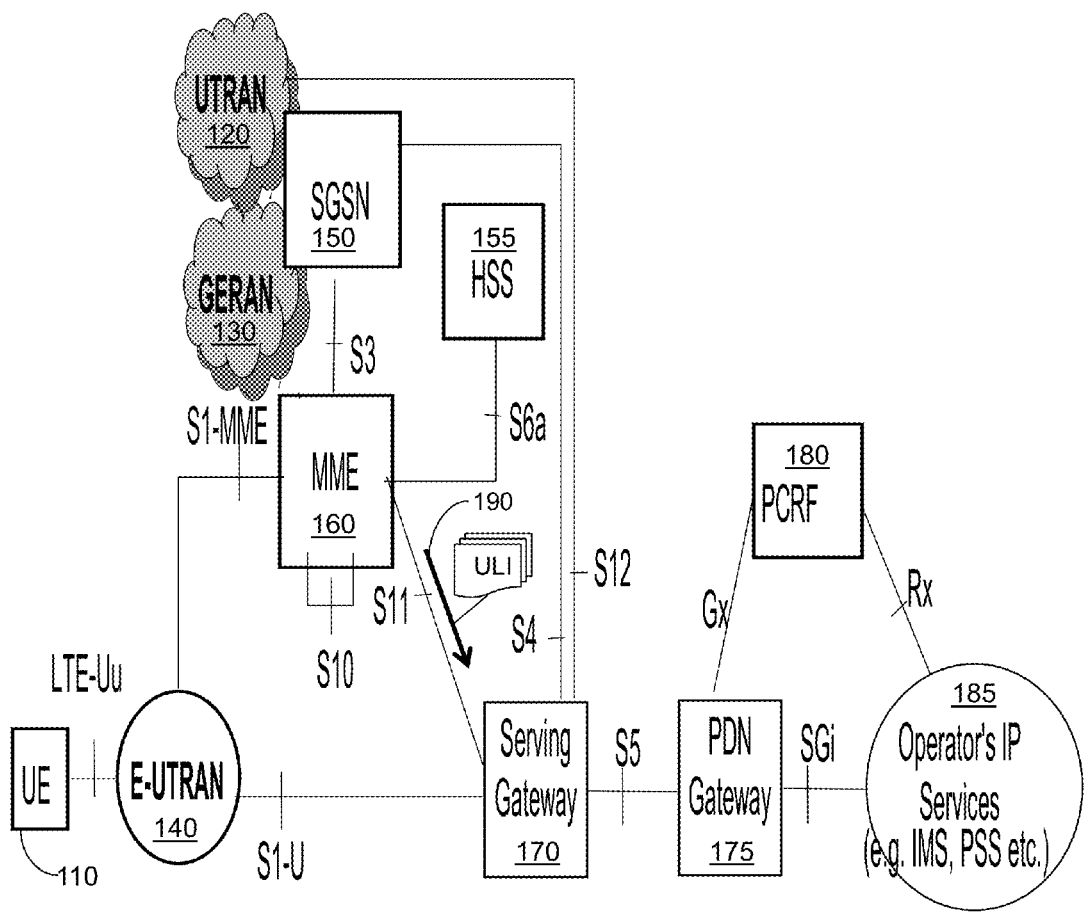
FIG. 1 depicts an illustrative embodiment of a system for selectively delivering user location information for subscribed events/sub-events corresponding to user sessions to communication service network elements.

The subject disclosure describes, among other things, illustrative embodiments of a method and system for managing user location information in a communication system. The exemplary embodiments manage the reporting of User Location Information (ULI) which can include cell ID and/or local time information (e.g., a time stamp). The reporting can be based on ULI event triggers with the Policy Charging Control (PCC) frame work, which can include the Policy and Charging Rules Function (PCRF), and/or the Policy and Charging Enforcement Function (PCEF) such as the PDN gateway and database for subscriber policy information in a core network. The ULI event triggers can allow application servers to selectively subscribe to the ULI reporting events and/or sub-events that are associated with the application service requirements. In one or more embodiments, core network nodes (e.g., one or more of MME, HSS, SGSN, P-GW, S-GW and so forth) and/or IP Multimedia Subsystem (IMS) nodes need to only report ULI to the application servers for subscribed events/sub-events. This can reduce the signaling load in the core and/or IMS network, while still providing ULI to application servers for various functions such as billing records, network performance monitoring/analysis, and so forth. Other embodiments are included in the subject disclosure.

The exemplary embodiments described herein can account for a massive number of ULI update notifications which, without the exemplary limiting of ULI reporting, would cause an excessive signaling load, such as within the MME/SGSN (source of the ULI update); the SGW, PGW, and possibly H/V-PCRF in roaming case (relay of the ULI update); and/or the PCRF/OCS (consumer of the ULI update) and to IMS (IP Multi-media Service) system and service elements. This massive number of ULI update notifications can be caused due to the density of users at a specific location (e.g., train stations, football stadium, and so forth), and abnormal non-human events in which users simultaneously connecting to the network. The exemplary embodiments can limit ULI reporting and thus reduce signaling overload by restricting ULI reporting to those recipient devices that have subscribed to a particular session event that is pertinent to the functions of the recipient devices (e.g., application servers).

One embodiment of the subject disclosure is a method in which a system including a processor receives a subscription from an application server, where the system performs policy control and charging functions in a mobile communications network, and where the subscription identifies a session event or sub-event occurring in a communication session for which the application server requests user location information. The method can include providing, by the system, subscription information based on the subscription to core network nodes of the mobile communications network. The method can include receiving, by the system, user location information from the core network nodes responsive to a detection of a triggering event corresponding to the session event or sub-event of the subscription. The method can include providing, by the system, the user location information to an IP multimedia subsystem network for delivery to the application server. The delivery of the user location information can be limited to application servers that are subscribed to the session event, and/or only for the triggering events/sub-events subscribed.

One embodiment of the subject disclosure includes a system having a memory to store executable instructions, and a processor coupled to the memory, where the processor, responsive to executing the executable instructions, performs operations including performing policy control and charging functions in a mobile communications network. The processor can receive subscriptions from a subset of application servers of a plurality of application servers, where the subscriptions identify a set or subset of session events of a communication session for which application servers request user location information. The processor can provide subscription information based on the subscriptions to core network nodes of the mobile communications network. The processor can receive user location information from the core network nodes responsive to detection of triggering events corresponding to the session events of the subscriptions. The processor can provide the required user location information to an IP multimedia subsystem network for delivery to application servers without delivery of undesired user location information to application servers, or to the plurality of application servers that did not subscribe to the session events.

One embodiment of the subject disclosure includes an application server including a memory to store executable instructions, and a processor coupled to the memory, where the processor, responsive to executing the executable instructions, performs operations including providing a subscription to a system that performs policy control and charging functions in a mobile communications network, where the subscription identifies a first session event for which the application server requests first user location information. The operations can include receiving, from an IP multimedia subsystem network, the first user location information of a communication session corresponding to a detection of a first triggering event corresponding to the first session event of the subscription, where the processor does not receive second user location information of the communication session when a detection of a second time the triggering event occurs, and where the triggering event corresponds to a session event of the communication session for which the application server is not subscribed.

In the exemplary embodiments, a subscription can include a request, a notice or other information that is exchanged or otherwise provided so that one or more devices can be associated, correlated, indexed, and/or related to one or more events or sub-events.

FIG. 1 depicts an illustrative embodiment of a system that can selectively deliver ULI to recipient devices (e.g., application server(s)) that have subscribed to or otherwise requested delivery of the ULI. By selectively delivering the ULI to only devices that desire to receive the ULI, or delivering of ULI only for subscribed set or subset of the events, system 100 can reduce network load. Also, system 100 can designate or otherwise define the situations in which the subscribing recipient devices will receive the ULI, such as based on ULI event triggers. The ULI can include various information such as cell ID, local time information, time stamp, Tracking Area Identity (TAI) and/or E-UTRAN Cell Global Identifier (ECGI) for a registered end user device.

In FIG. 1, a mobile communication system 100 is illustrated that can provide communication services, including voice, video and/or data services to mobile devices, such as end user device 110. System 100 can enable communication services over a number of different networks, such as between end user device 110 and another communication device (e.g., a second end user device) not shown. End user device 110 can be a number of different types of devices that are capable of voice, video and/or data communications, including a mobile device (e.g., a smartphone), a personal computer, a set top box, and so forth.

System 100 can include one or more of a Universal Terrestrial Radio Access Network (UTRAN) 120, a Global System for Mobile communications (GSM) Enhanced Data rates for GSM Evolution (EDGE) Radio Access Network 130 (herein referred to as GERAN 130), and an E-UTRAN 140. The system 100 can further include one or more of a Serving General packet radio service (GPRS) Support Node (SGSN) 150, and a Mobility Management Entity (MME) 160. Other components not shown can also be utilized for providing communication services to the UE 110, such as a Mobile Switching Center (MSC) which can facilitate routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, system 100 can provide for circuit switching fallback for packet switching so as to enable the provisioning of voice and other circuit switching-domain services (e.g., circuit switching UDI video/LCS/USSD) by reuse of circuit switching infrastructure, such as when the end-user device 110 is served by E-UTRAN 140. In one or more embodiments, a circuit-switching fallback enabled terminal (e.g., UE 110) connected to E-UTRAN 140 may use GERAN 130 or UTRAN 120 to connect to the circuit switching-domain. In one or more embodiments, the circuit switching fallback and Internet Protocol Multimedia Subsystem (IMS)-based services of system 100 can co-exist in a single service operator's network 185.

In one or more embodiments, UTRAN 120 can include node B's and radio network controllers which enable carrying many traffic types including real-time circuit-switched to IP-based packet switched traffic. The UTRAN 120 can also enable connectivity between the end user device 110 and the core network. The UTRAN 120 can utilize a number of interfaces including Iu, Uu, Iub and/or Iur. In one or more embodiments, GERAN 130 can facilitate communications between base stations (e.g., Ater and Abis interfaces) and base station controllers (e.g., A interfaces).

In one or more embodiments, E-UTRAN 140 can be the air interface for the LTE upgrade path for mobile networks according to the 3GPP specification. E-UTRAN 140 can include enodeBs on the network that are connected to each other such as via an X2 interface, which are connectable to the packet switch core network via an S1 interface. For example, E-UTRAN 140 can use various communication techniques including orthogonal frequency-division multiplexing (OFDM), multiple-input multiple-output (MIMO) antenna technology depending on the capabilities of the terminal, and beamforming for downlink to support more users, higher data rates and lower processing power required on each handset.

In one or more embodiments, the SGSN 150 can assume responsibility for delivery of data packets from and to mobile stations within the SGSN's geographical service or coverage area. The SGSN 150 can perform functions including packet routing and transfer, mobility management (e.g., attach/detach and location management), logical link management, and/or authentication and charging functions. In one or more embodiments, a location register of the SGSN 150 can store location information (e.g., current cell) and user profiles (e.g., addresses used in the packet data network) of users registered with the SGSN.

In one or more embodiments, a Home Subscriber Server (HSS) 155 can be provided that is a central database that contains user-related and subscription-related information. The functions of the HSS 155 include functionalities such as mobility management, call and session establishment support, user authentication and access authorization. In one embodiment, the HSS 155 can manage subscription-related information in real time, for multi-access and multi-domain offerings in an all-IP environment. The HSS 155 can be based on Home Location Register (HLR) and Authentication Center (AuC).

In one or more embodiments, MME 160 can perform the function of a control-node. For example, the MME 160 can perform functions such as idle mode tracking and paging procedure including retransmissions. The MME 160 can also choose a serving gateway for the end user device 110 such as at the initial attach and at time of intra-LTE handover involving node relocation.

In one or more embodiments, a Serving Gateway (SGW) 170 can route and forward user data packets, while also acting as the mobility anchor for the user plane during inter-eNodeB handovers and as the anchor for mobility between LTE and other 3GPP technologies (e.g., terminating S4 interface and relaying the traffic between 2G/3G systems and PGW). For idle state UEs, the SGW 170 can terminate the downlink data path and can trigger paging when downlink data arrives for the UE. The SGW 170 can manage and can store UE contexts, e.g. parameters of the IP bearer service, network internal routing information.

In one or more embodiments, a PDN Gateway (PGW) 175 can provide connectivity from the UE 110 to external packet data networks by being the point of exit and entry of traffic for the UE. A UE 110 can have simultaneous connectivity with more than one PGW 175 for accessing multiple PDNs. The PGW 175 can perform policy enforcement, packet filtering for each user, charging support, lawful interception and/or packet screening. The PGW 175 can also act as the anchor for mobility between 3GPP and non-3GPP technologies such as WiMAX and 3GPP2 (CDMA 1X and EvDO).

In one or more embodiments, a Policy Control Resource Function (PCRF) 180 can be provided. For example, the PCRF 180 can be a software node designated in real-time to determine policy rules. As a policy tool, the PCRF 180 can operate at the network core and can access subscriber databases and other specialized functions, such as a charging system, in a centralized manner. The PCRF 180 can aggregate information to and from the network, operational support systems, and other sources (such as portals) in real time, supporting the creation of rules and then automatically making policy decisions for each subscriber active on the network. The PCRF 180 can provide a network agnostic solution (e.g., wire line and/or wireless) and can be integrated with different platforms like billing, rating, charging, and subscriber database or can also be deployed as a standalone entity. The functions performed by the PCRF 180 can be any variety of functions, such as computer implemented steps in a process or algorithm associated with operation of a mobile communications network.

In one or more embodiments, system 100 can modify existing mechanisms for reporting ULI where the existing mechanisms are defined in the 3GPP Release 11, which is incorporated by reference herein. For example, system 100 can specify ULI event triggers for different scenarios when a wireless customer's location (or other data contained in the ULI) is of interest to an application server, such as specifying an event trigger for a session initiation, for a session update and/or for a session termination. In one embodiment, the cause of a session event can be determinative of whether the session event is designated as a session event trigger, such as designating first session terminations resulting from a first causation as a session event trigger but not designating second session terminations resulting from a second causation as the session event trigger. Similarly, in one embodiment, session updates caused by user mobility may not be designated as a session event trigger while session updates for some other reason may be designated as a session event trigger.

Recipient devices (e.g., application servers) can then subscribe to ULI events so that core network nodes (e.g., MME 160) report the ULI to the PCC (e.g., PCRF 180) only for those events subscribed to by the application servers for a user session. An example of the selective reporting of the ULI is depicted by arrow 190 of FIG. 1. The PCRF 180 can limit reporting of the ULI to those application servers (e.g., via the IMS 185) that are subscribed to the detected event. The application servers or other recipient devices can then utilize the ULI for various functions, such as billing records or network performance monitoring/analysis.

Figure 2:
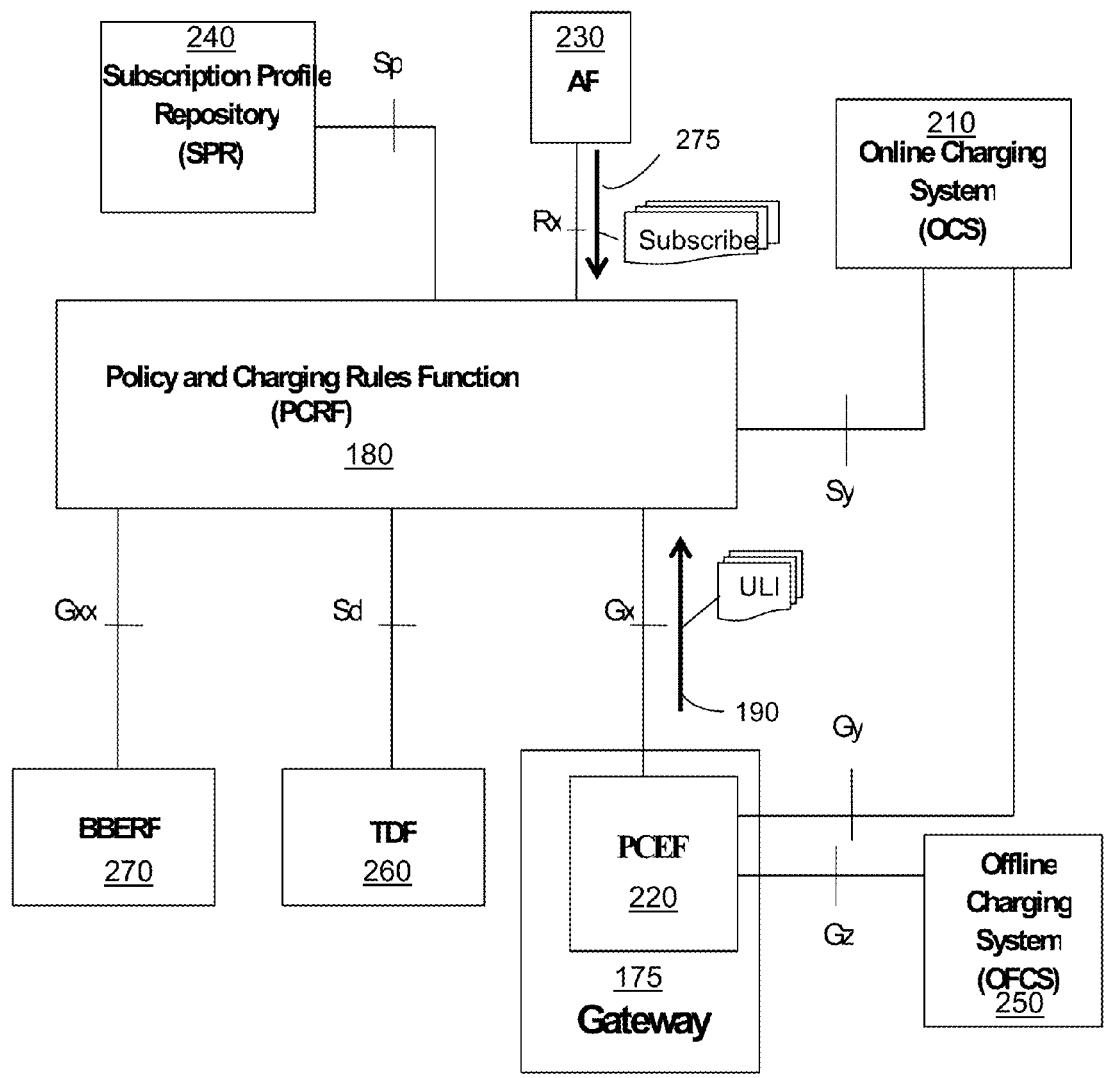
FIG. 2 depicts an illustrative embodiment of another system for selectively delivering user location information to subscribed devices (e.g., an application server (AF))

FIG. 2 depicts an illustrative embodiment of a communication system 200 that can be coupled with all or a portion of system 100. System 200 can perform PCC functions, such as via Diameter network elements, for implementing, enforcing and controlling charging and policy. As an example, in one embodiment, the Diameter network elements and/or the implemented functions can be those that are part of the 3GPP Policy and Charging Control architecture defined in 3GPP TS 23.203 and the Charging Architecture defined in 3GPP TS 32.240, the disclosures of which are hereby incorporated by reference. System 200 can support either or both of an internal and external Online Charging System (OCS) 210 and can include an online business logic function (not shown) to mediate IMS level online charging. System 200 can utilize real-time session management and QoS, which involve the synchronization and simultaneous use of charging and policy control, to intertwine these functions and their corresponding network elements.

System 200 can include PCRF 180, a Policy Control Enforcement Point (PCEF) 220, the Application Function (AF) or application servers 230 which can be a Proxy CSCF (P-CSCF), a Subscriber Profile Repository (SPR) 240, the OCS 210, an Offline Charging System (OFCS) 250 which can be implemented by a Charging Data Function (CDF) and Charging Gateway Function (CGF), the AS, a Media Resource Controller Function (MRFC), a Traffic Detection Function (TDF) 260, and a Gateway Function (GWF) from the S-CSCF. In one embodiment, system 200 can map policy control network elements (e.g., PCRF 180, SPR 240, OCS 210) and/or charging network elements (e.g., OCS 210, AF 230) together on a per user and/or per session basis. In one embodiment, the system 200 can create a binding per user session between the PCRF 180 and various network elements and also between the OCS 210 and various network elements.

The PCRF 180 can encompass policy control decision and flow based charging control functionalities. The PCRF 180 can provide network control regarding the service data flow detection, gating, QoS and flow based charging (except credit management) towards the PCEF 220. The PCRF 180 can authorize QoS resources. The PCRF 180 can use the service information received from the AF 230 (e.g. SDP information or other available application information) and/or the subscription information received from the SPR 240 to calculate the proper QoS authorization (QoS class identifier, bitrates). The PCRF 180 can also take into account the requested QoS received from the PCEF 220 via Gx interface.

The PCEF 220 can encompass service data flow detection, policy enforcement and flow based charging functionalities. This functional entity can be located at the Gateway (e.g. GGSN in the GPRS case, and PDG in the WLAN case). The PCEF 220 can provide service data flow detection, user plane traffic handling, triggering control plane session management (where the IP-CAN permits), QoS handling, and service data flow measurement as well as online and offline charging interactions.

Other core network nodes, such as eUTRAN 140, HSS 155, MME 160, SGW 170 can be connected to the PCEF 220 via SGW, as shown in FIG. 1. The AF 230 can offer applications that require dynamic policy and/or charging control over the IP-CAN user plane behavior. The AF 230 can communicate with the PCRF 180 to transfer dynamic session information, required for PCRF decisions as well as to receive IP-CAN specific information and notifications about IP-CAN bearer level events. An AF 230 can be the IMS network (which has many functional nodes), or the application servers connected to IMS network, as shown in FIG. 1 as Operator's IP Services 185. One example of an AF 230 is the VoLTE Server, which handles Voice over LTE and other multi-media services. The signaling control for VoLTE can be handled by the IMS network.

The SPR 240 can contain all subscriber/subscription related information needed for subscription-based policies and IP-CAN bearer level PCC rules by the PCRF 180. The OCS 210 can perform online credit control functions such as specified in 3GPP TS 32.240, the disclosure of which is hereby incorporated by reference. The OCS can trigger the PCEF 220 to initiate an IP-CAN bearer service termination at any point in time. The OFCS 250 can function as billing servers. The Bearer Binding and Event Reporting Function (BBERF) 270 can perform functionalities including Bearer binding, Uplink bearer binding verification, Event reporting to the PCRF 180, Sending or receiving IP-CAN-specific parameters, to or from the PCRF. The Traffic Detection Function (TDF) 260 can perform application detection and reporting of detected application and its service data flow description to the PCRF.

System 200 can perform event triggering. The Event Reporting Function (ERF) in PCEF 220 and/or BBERF 270 can perform event trigger detection. When an event matching the event trigger occurs, the ERF can report the occurred event to the PCRF 180. The event trigger can define the conditions when the ERF shall interact again with PCRF 180 after an IP-CAN session establishment. As an example, event triggers are defined in Sec. 6.1.4 table 6.2 in TS 23.203 of the 3GPP specification (which is incorporated herein by reference), such as, PLMN change, QoS change, location change, enforced PCC rule change, UE IP address change, and so forth. The PCRF 180 can subscribe to the PCEF 220 for new event triggers or remove armed event triggers unsolicited at any time or upon receiving a request from an AF 230.

System 200 enables AFs 230 to subscribe to the PCRF 180 for ULI reporting events that are of concern to the particular AF. The subscribing function is illustrated by arrow 275. The PCRF 180 can communicate the subscription information to core network nodes such as PCEF 220, which can inform the MME 160 of the ULI event reporting registration for the corresponding AF 230. The core network nodes can then report the ULI to PCC (via PCEF 220 and PCRF 180) only for those events subscribed by AFs for a user session. The PCC will report the select ULI to IMS, which will forward the ULI to the application server (AF 230) which has subscribed to the events.

System 200 can provide selective distribution of ULI to subscribing devices, such as AFs 230, based on subscription information corresponding to particular triggering events, such as session initiation, session update and/or session termination. In one or more embodiments, triggering events/sub-events can be defined that correspond to session events/sub-events which can mean that the triggering event/sub-event is detected and that the detection is indicative of the existence of the actual event/sub-event. This selective distribution of ULI is in contrast with an "Access Network Information Report" defined in Sec. 6.1.4 table 6.2 in TS 23.203 (the disclosure of which is hereby incorporated by reference) which causes all ULI for a subscribed session to be reported from the core network to a PCEF, then to a PCRF which forwards the information to the IMS application servers which requested it. The "Access Network Information Report" requires core network and IMS nodes to report all ULI with the subscriber and the session, including session initiation, session updates (e.g., caused by user mobility and other reasons) and session terminations. In one or more embodiments, the delivery of the user location information can be limited to application servers that are subscribed to the session event/sub-event such that the ULI is not delivered to other application servers that lack the subscription (e.g., other application servers which are not associated, corresponding, indexed or related to the particular session event/sub-event that has occurred.

Figure 3:
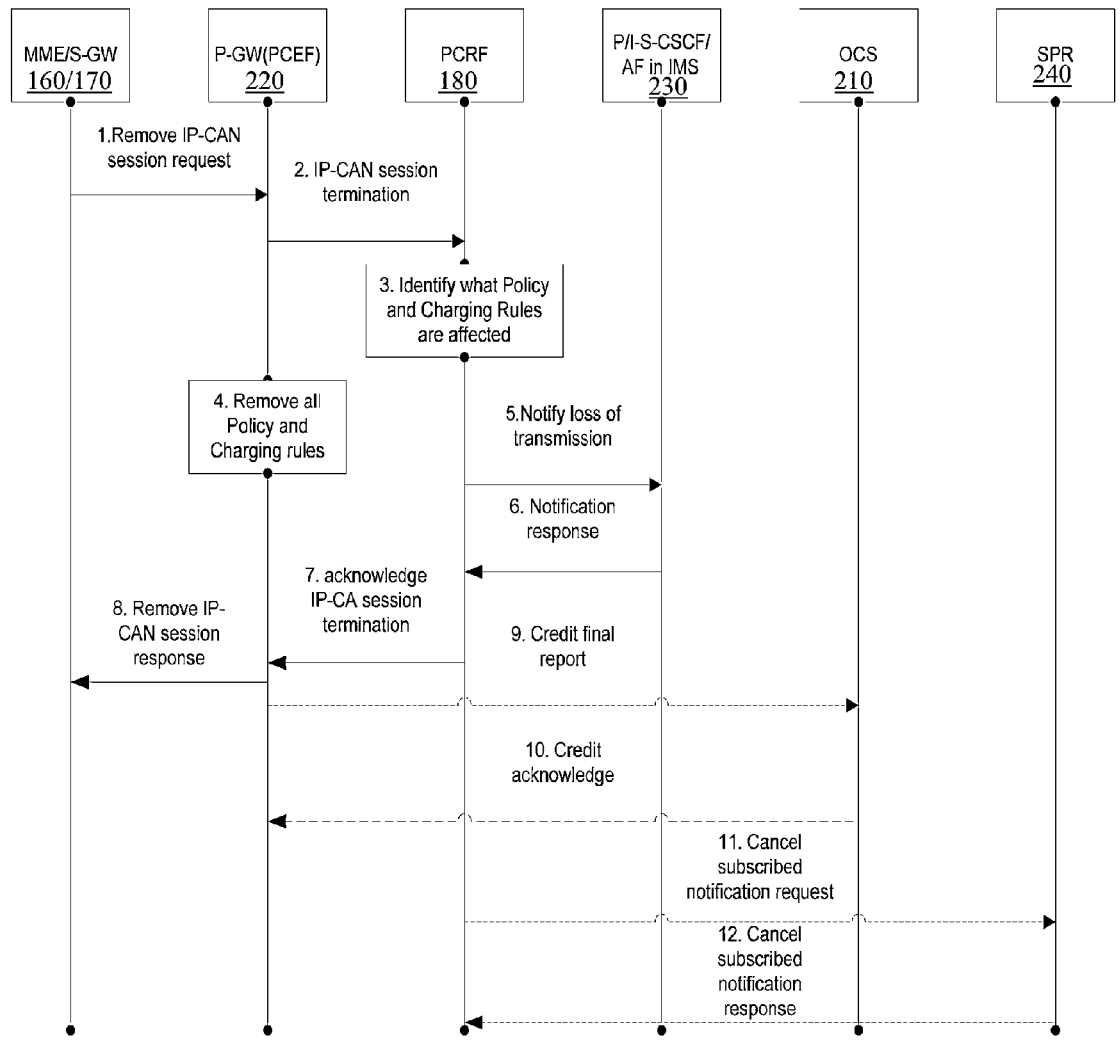
FIG. 3 depicts an illustrative embodiment of a flow chart for selectively delivering user location information to a subscribing device (e.g., AF)

Referring to FIG. 3, a flow chart 300 is illustrated depicting a UE initiated IP-CAN session termination, resulting in an event trigger reporting for ULI. This example is based on a session termination being designated as the ULI triggering event, although the exemplary embodiments can designate other triggering events such as a session initiation and/or a session update.

At step 1, MME 160 receives a UE session termination request from eUTRAN 140, and sends a "Remove IP-CAN session request" to the PCEF 220 via the S-GW 170. Among other parameters MME 160 sends to the PCEF 220, ULI is included if the ULI reporting is subscribed to for the session by the AF 230.

At step 2, a PCEF/GW initiated GW Control Session Termination procedure indicates that the IP-CAN Session is being removed and provides relevant information to the PCRF 180, which includes the ULI if subscribed to by the AF 230.

At step 3, the PCRF 180 finds the PCC Rules that require an AF 230 to be notified and removes PCC Rules for the IP-CAN session.

At step 4, PCEF 220 removes all PCC Rules associated with the IP-CAN session.

At step 5, PCRF 180 notifies the AF 230 that there are no transmission resources for the service if this is requested by the AF together with the session information including the ULI.

At step 6, AF 230 acknowledges the notification of the loss of transmission resources.

At step 7, the PCRF 180 removes the information related to the terminated IP-CAN Session (e.g., subscription information), and acknowledges to the PCEF 220 that the PCRF handling of the IP-CAN session has terminated. This interaction is the response to the PCEF 220 request in step 2.

At step 8, PCEF 220 continues the IP-CAN Session removal procedure.

At step 9, if online charging is applicable, the PCEF 220 issues final reports and returns the remaining credit to the OCS 210.

At step 10, if online charging is applicable the OCS 210 acknowledges that credit report and terminates the online charging session.

At step 11, PCRF 180 sends a cancellation notification request to the SPR 240 if it has subscribed such notification.

At step 12, SPR 240 sends a response to the PCRF 180.

Figure 4:
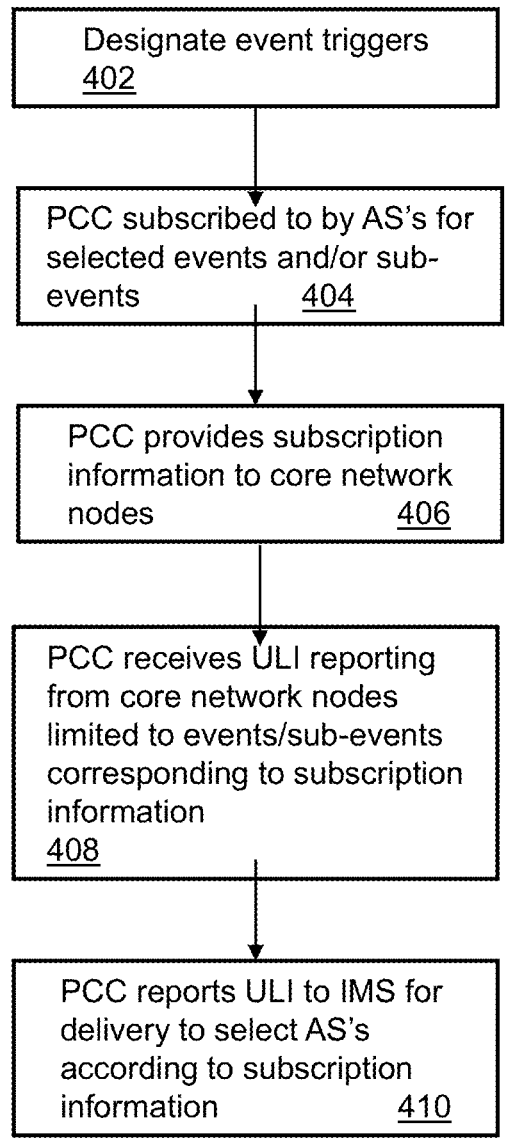
FIG. 4 depicts an illustrative embodiment of a method for selectively delivering user location information to subscribing devices (e.g., AF)

FIG. 4 depicts an illustrative embodiment of a method 400 for managing the delivery of ULI to application servers or other recipient devices. The ULI can be utilized for various functions. For example, ULI can be used for user billing records. As another example, ULI can be used for location based services, such as a prepaid service where the location and time information is used for service authorization with a user's prepaid account status. In another example, ULI can be used for network performance analysis and troubleshooting purposes. For instance, if a subscriber is concerned about dropped calls, the ULI in a Call Detail Record (CDR)

from all core network nodes and IMS nodes can be used for analysis. Method 400 can be used for managing the delivery of ULI to specific devices (e.g., application servers) that desire the ULI as opposed to a mechanism that requires core network nodes to report all the ULI including intermediate cell changes with user mobility during a subscribed session, and in which an application server may not be interested. Method 400, by managing and limiting the delivery of the ULI, can reduce signaling load to the core and IMS networks.

Method 400 can begin at 402 with a designation of one or more session event/sub-event triggers associated with a communication session whereby the detection of the session event will result in delivery of ULI to a subscribed device (e.g., AFs 230). For instance, the session event triggers can be one or more of a session initiation, a session update or a session termination. The session event triggers can be particular events that occur within a communication session. In one embodiment, the session event triggers can be limited to session initiation and session termination while session updates are specifically excluded. In another embodiment, the session event triggers can includes particular types of session updates, such as excluding session updates that are caused by user mobility while including other types of session updates as session event triggers.

Other session event triggers can also be used, such as distinguishing between types of session terminations. For example, a first session termination as a result of a UE or MME requested PDN disconnection associated with a radio access bearer release can be designated as being a session event trigger while a second session termination as a result of a release of a logical S1-AP signaling connection (over S1-MME) and all S1 bearers (in S1-U) associated with a UE context release request can be designated as not being a session event trigger. In this example, subscribing devices (e.g., AFs 230) can subscribe to the first session termination and a detection of a UE or MME requested PDN disconnection associated with a radio access bearer release will result in delivery to the subscribing devices of ULI. But, a detection of the second session termination as a result of a release of a logical S1-AP signaling connection (over S1-MME) and all S1 bearers (in S1-U) associated with a UE context release request will not result in delivery of ULI to any of the subscriber devices since this is not a designated session event trigger.

The designation of the session event trigger can be static or dynamic. For example, a service provider can pre-define session event triggers and provision one or more network elements with a list of session event triggers to select from. As an example, the PCRF 180 can be provisioned with the valid designated session event triggers and can receive subscription requests from AFs 230 which identify triggering events for which the AFs 230 request ULI. A comparison can then be performed to identify valid subscriptions based on those triggering events identified by the AFs 230 which the PCRF 180 recognizes as a valid session triggering event. In another embodiment, the designation of the session triggering events can be done by the AFs 230 requesting the ULI such that the PCRF 180 authorizes delivery of ULI to a subscribing AF 230 for any triggering event defined by the particular AF.

In one embodiment, specific events occurring within a communication session can be designated as invalid session event triggers. For instance, a service provider may allow an AF 230 to designate any events occurring within the communication session as session event triggers so as to receive ULI for these particular triggers except for events that are specifically prohibited from being a session event trigger. Continuing with this example, the service provider may determine that reporting ULI to subscribing AFs each time a session termination resulted from a release of a logical S1-AP signaling connection (over S1-MME) and all S1 bearers (in S1-U) would result in an undesired signaling load and may specifically prohibit this event from being designated by the AFs as a session event trigger.

At 404, the PCC (e.g., PCRF 180) can be subscribed to by a subscribing device such as AF 230. This allows an AF 230 to selectively receive ULI based on events that are pertinent to the functions being performed by the AF without receiving unnecessary ULI for events that are not pertinent to the functions being performed by the AF. As an example, an AF 230 that is performing network performance analysis can subscribe to session terminations caused by an undesired condition while not subscribing to session terminations that are at the request of the UE. In this example, the AF 230 can monitor problematic communication sessions based on ULI without being burdened with other ULI from communication sessions that were successfully completed.

At 406, the PCC (e.g., PCRF 180) can provide or otherwise distribute subscription information for the subscribing devices to various other network elements such as core network nodes. As an example, the PCRF 180 can provide the subscription information to the PCEF 220 which provides the subscription information to the MME 160 and/or the HSS 155. The distribution of the subscription information enables ULI event reporting registration for each AF 230 (or other subscribing device) that is selectively requesting ULI for particular session event triggers.

At 408, the PCC can receive ULI from core network nodes based on a detection of a session event where the ULI reporting is limited to session events corresponding to the subscription information. As an example, ULI can be gathered or otherwise generated by MME 160 responsive to detecting a session event described in the subscription information and then the ULI can be delivered to the PCRF 180 via PCEF 220.

At 410, the PCC can deliver the ULI to the subscribing devices (e.g. AF 230) that have subscribed to the particular session event that has been detected. As an example, the PCRF 180 can provide the ULI to the IMS network 185 which delivers the ULI to those AFs 230 that have subscribed to the particular detected event corresponding to the ULI. AFs that have not subscribed to the detected event will not receive the ULI. The subscribing devices, such as AF 230, can then utilize the ULI to perform various functions such as billing, network performance analysis, location-based service authorization, and so forth.

Method 400 can also be used in place of or in combination with other techniques for limiting ULI delivery. For example, areas can be defined where an AF is interested in ULI, and the core network nodes and PCC would only report the ULI in these defined areas. For instance, the delivery of ULI can be dependent on whether the UE is inside or outside a specific set of cells and/or serving areas associated with the user subscription. One technique would be tracking incoming and outgoing users from a specific area of interest (e.g. group of cells or LA/RA/TA) while there would be no reporting of ULI for mobility events not inducing the specific area of interest. Another technique would be tracking an individual user only within a specific area of interest (e.g. group of cells or LA/RA/TA) while there would be no reporting of ULI for mobility events not inducing the specific area of interest. Method 400 can be further applied to these area-based techniques such that ULI reporting for a designated area is further limited based on subscription by AFs 230 to particular session event triggers associated with the defined areas. For instance, incoming and outgoing users from a specific area of interest can be tracked for delivery of ULI but the delivery only occurs in response to detecting a designated session event (e.g., a session termination) and is only delivered to those AFs that have subscribed to that designated session event trigger.

As another example, ULI reporting would only be sent when the UE is in a "CONNECTED" state—the node serving the UE (MME/SGN) can defer ULI reporting related with RA/TA change as long as the UE is without active radio and S1/Iu user plane bearers or is in 2G STAND-BY state. Method 400 can be further applied to this technique to limit delivery of the ULI to those AFs that have subscribed to the particular detected session event.

As another example, the PCRF, IMS application servers and/or OCS would only be interested in knowing when a user session is started, terminated and/or dropped or whether the user is inside or outside a specific area(s) rather than knowing user location during all the session at each location change in order to define QoS and charging policies to apply to data services, and/or for network performance monitoring and trouble shooting. A ULI reporting mechanism using the LCS procedures would save signaling traffic due to user location updates procedures in the GPRS/EPC core networks and control plane interfaces. Instead of tracking reporting on a per user basis, defining areas of interest and tracking the identity of the users within these areas will reduce considerably the signaling traffic load in the core network and control plane interfaces. Method 400 can be further applied to this technique to limit delivery of the ULI to those AFs that have subscribed to the particular detected session event.

Various session event triggers can be designated to manage the delivery of ULI to subscribing recipient devices such as AFs 230. Table 1 lists examples of scenarios for ULI reporting that can be used with method 400:

| Section | Scenario | eNB->MME | MME->SGW modify bearer request | SGW->PGW modify bearer request | P-GW->PCRF session modification |
|---|---|---|---|---|---|
| 5.3.2.1 | Attach | | stp 12, create session req, | stp 13 create ses req, | stp 14, |
| 5.3.3.0A | TAU, in ECM-CONNECTED | TAI + ECGI of the current cell in every S1-AP UPLINK NAS TRANSPORT message | | | |
| 5.3.3.1 | TAU w SGW change | Y, step3eNB > new MME | Stp 8, MME > new SGW, create ses req, ULI | Y, stp 9 ULI | Per 23.203, stp 9a, |
| 5.3.3.2 | TAU w/o SGW change | Stp 3 TAI ECGI | Stp9 ULI | Stp 10 ULI, | Per 23.203, stp 9a, |
| 5.3.3.3 | RAU EUTRAN > 2/3G SGSN w/o SGW change | | Stp 7, create session req, SGSN > SGW, ULI | Stp 8, | Stp 9, per 23.203 |
| 5.3.3.6 | RAU EUTRAN > 2/3G SGSN w SGW change | | Stp 7, create session req, SGSN > SGW, ULI | Stp 8 ULI, | Stp 9, per 23.203 |
| 5.3.4 | UE Service request | TAI + ECGI | Stp 8, ULI | Stp 9 ULI, | Stp 10, per 23.203 |
| 5.3.5 | release the logical S1-AP signalling connection (over S1-MME) and all S1 bearers (in S1-U) | Stp 1b, S1 UE Context Release Request (Cause) | Stp2, Release access bearer, no ULI | | |
| 5.3.8.2 | UE-initiated detach | | Stp2, delete session req, ULI, | Stp5, delete session, ULI | Stp8, per 23.203 |
| 5.3.8.3 | MME-initiated detach | | Stp2, delete session req, ULI, | Stp6, ULI, | Stp8, ULI if requested |
| 5.3.8.4 | HSS-initiated detach | | Stp3, MME/SGSN, delete session, ULI for active PDN con, | Stp4, delete session ULI | |
| 5.4.1. | Dedicated bearer activation | | Stp10, bearer activation, ULI, | Stp11, Create Bearer Response, ULI, | Stp12, session mod, ULI if requested, |
| 5.4.2.1 | PDN initiated Bearer modification w QoS update | | Stp10, update bearer resp, ULI, | Stp11, update bearer resp, ULI, | Stp12, session mod, ULI if requested, |

-continued

| Section | Scenario | eNB->MME | MME->SGW modify bearer request | SGW->PGW modify bearer request | P-GW->PCRF session modification |
|---|---|---|---|---|---|
| 5.4.2.2 | HSS initiated subscriber QoS mod | | Stp6, update bearer resp, ULI, | Stp7, update bearer resp, ULI, | |
| 5.4.3 | PGW initiated bearer modification | | Stp8, update bearer resp, ULI, | Stp9, update bearer resp, ULI, | Stp10, session mod, ULI if requested, |
| 5.4.4.1 | PGW initiated bearer deactivation | | Stp8, MME/SGSN Delete Bearer Resp, ULI(last known) | Stp9, MME/SGSN Delete Bearer Resp, ULI | Stp10, session mod, ULI if requested, |
| 5.4.4.2 | MME initiated bearer deactivation | | Stp2, delete bearer command, ULI | Stp3, delete bearer command, ULI | Stp4, session mod, ULI if requested, |
| 5.5.1.1.2 | X2 based HO w/o SGW change | TAI + ECGI | step2, ULI | step 3, ULI | |
| 5.5.1.1.3 | X2 based HO w SGW change | | step2 create session req to target SGW, ULI | step3, ULI | |
| 5.5.1.2.2 | S1-based HO normal | | step 15 ULI, SGW relocated or not, | step16, ULI | |
| 5.5.2.1.3 | IRAT EUTRAN > UTRAN Iu mode | | step7, target SGSN > SGW, ULI | step 8, ULI | |
| 5.5.2.2.3 | UTRAN > EUTRAN Iu mode | | step 8, ULI | step 9, ULI | |
| 5.10.2 | UE requested PDN connectivity | | step2 create session req, ULI | step 3, create session req, ULI, | |
| 5.10.3 | UE or MME requested PDN disconnection | | Stp2, delete session req, ULI, | Stp3, delete session req, ULI, | |

Figure 5:
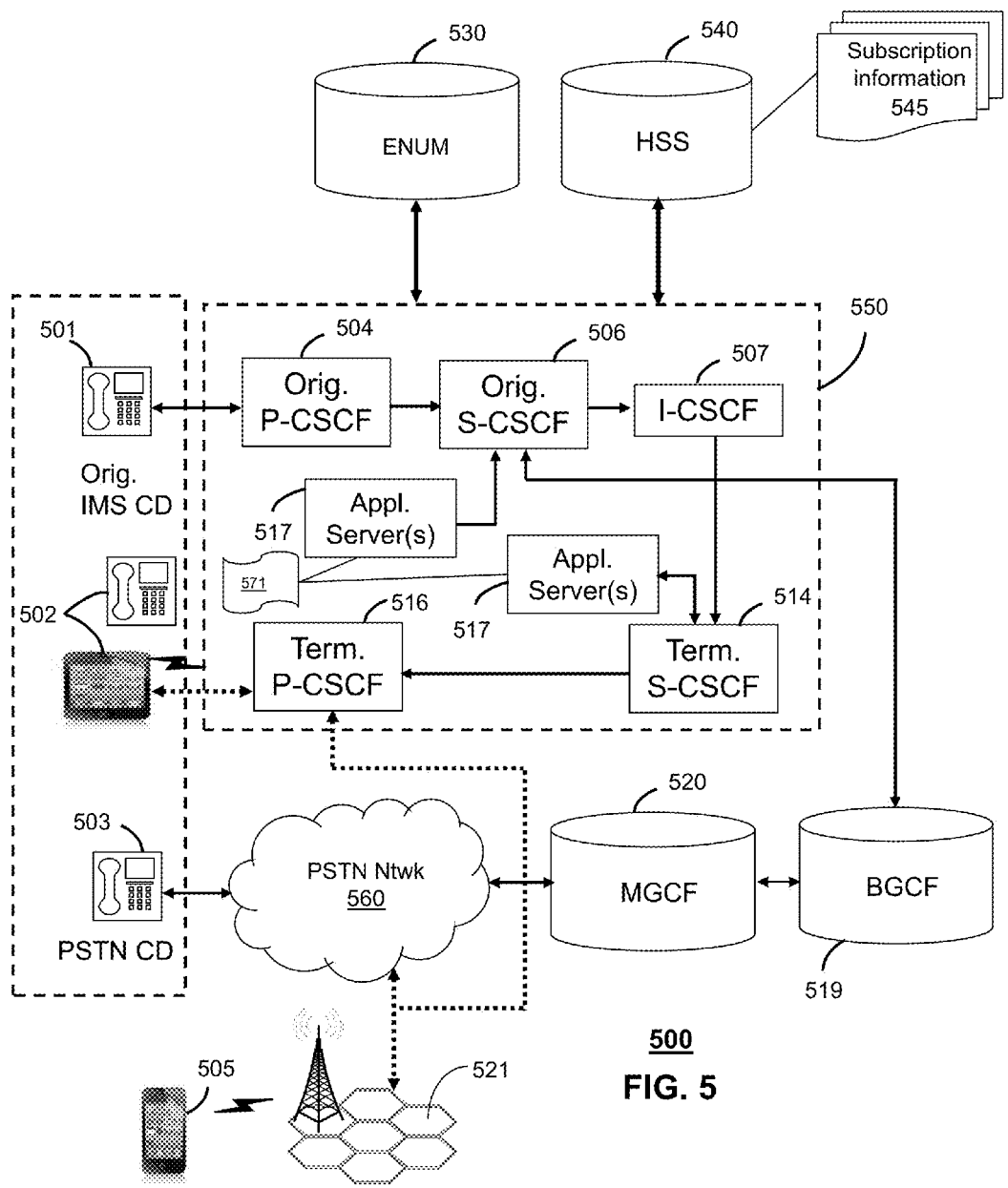
FIG. 5 depicts an illustrative embodiment of another system for selectively delivering user location information to subscribed devices (e.g., AF)

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100 and/or 200 of FIGS. 1 and 2 as another representative embodiment of communication system 500. System 500 can be used with method 400 for selectively delivering ULI to subscribed recipient devices, which in this example can be application servers that are part of the IMS network. System 500 allows for providing a subscription to another system or device (e.g., a PCC such as PCRF 180) that performs policy control and charging functions in a mobile communications network, where the subscription identifies a first session event for which an application server of system 500 requests first user location information. System 500 also allows the application server to receive the subscribed user location information of a communication session responsive to a detection of a first triggering event corresponding to the first session event of the subscription, where the application server does not receive the undesired user location information of the communication session when a detection of a subsequent triggering event occurs, and where the subsequent triggering event corresponds to a subsequent session event of the communication session for which the application server is not subscribed.

Communication system 500 can comprise a Home Subscriber Server (HSS) 540, a tElephone NUmber Mapping (ENUM) server 530, and other network elements of an IMS network 550. The HSS 540 can receive subscription information 545, such as from a PCC (e.g., PCRF 180 and/or PCEF 220 of FIG. 2). The subscription information 545 can be stored and used for a session event reporting registration process for subscribing devices (e.g., application servers 517 selectively requesting ULI). In one embodiment, the HSS 540 can report ULI, such as by querying PCRF, which will report upon detection of session events identified in subscription information while not reporting other ULI for session events that are not identified in subscription events. In another embodiment, the HSS 540 can be a repository for the The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506.

The originating S-CSCF 506 can submit the SIP INVITE message to one or more application servers 517 that can provide a variety of services to IMS subscribers. For example, the application servers 517 can be used for various functions including billing and/or network performance analysis. In one embodiment, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with multimedia and Internet services.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Application servers 517 can be adapted to perform function 571 (e.g., via software executed at the application server) which can include subscribing to session events for selective reporting of ULI. As an example, the application server 517 can subscribe to the PCC (e.g., PCRF 180) which allows the application server 517 to selectively receive ULI based on events that are pertinent to the functions being performed by the application server without receiving unnecessary ULI for events that are not pertinent to the functions being performed by the AF. For instance, an application server 517 that is performing location-based service authorization can subscribe to session initiation events and session updates caused by user mobility while not subscribing to session terminations. In this example, the application server 517 can monitor the location of the UE based on the ULI to enforce authorization of location-based services in only a particular area. The subscribing function 571 performed by the application server 517 can result in distribution of the subscription information 545 to devices that are part of the ULI reporting process, such as HSS 540 or an MME (not shown).

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
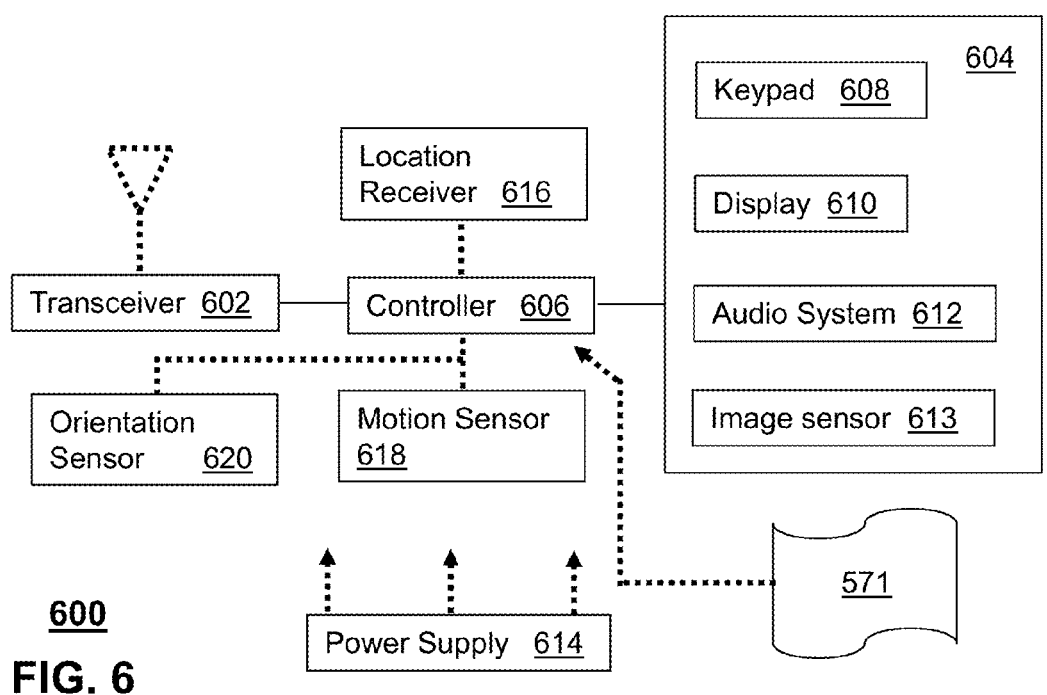
FIG. 6 depicts an illustrative embodiment of a communication device that can be used in the selective delivery of user location information.

FIG. 6 depicts an illustrative embodiment of a communication device 600. Communication device 600 can serve in whole or in part as an illustrative embodiment of the devices depicted in FIGS. 1-2 and 5, including application servers, PCEF devices, PCRF devices, UEs, HSS, MME and so forth. Device 600 can be a server that performs policy control and charging functions in a mobile communications network. Device 600 can receive subscriptions from a subset of application servers of a plurality of application servers, where the subscriptions identify session events of a communication session for which the subset of application servers request user location information, or a subset of the triggering events are subscribed. Device 600 can provide subscription information based on the subscriptions to core network nodes of the mobile communications network. Device 600 can receive user location information from the core network nodes responsive to detection of triggering events corresponding to the session events of the subscriptions. Device 600 can provide the user location information to an IP multimedia subsystem network for delivery to the subset of application servers without delivery to remaining application servers of the plurality of application servers that did not subscribe to the session events, or without delivering the ULI for undesired subsequent triggering events.

To enable selective reporting of ULI via a subscriber registration process, communication device 600 can comprise various components such as one or more of a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 shown in FIG. 6 or portions thereof can serve as a representation of one or more of the devices of systems 100, 200 and/or 500 of FIGS. 1, 2 and 5. In addition, the controller 606 can be adapted in various embodiments to perform the functions 571 to enable a subscriber registration process that distributes subscription information so that ULI is selectively reported based on particular detected session events that are pertinent to the functions of the subscribing device, such as ULI being reported for session termination events to an application server performing network performance analysis.

Upon reviewing the aforementioned embodiments, it would be evident to an artisan with ordinary skill in the art that said embodiments can be modified, reduced, or enhanced without departing from the scope of the claims described below. For example, variations of the subscription information can be generated from subscription requests by subscribing devices. As an example, first subscription information can include an identification of all session event triggers that have been subscribed to by a group of application servers (e.g., without identifying the application servers). This first subscription information can be received and stored by the MME, HSS, and or other network nodes. The first subscription information can then be utilized in conjunction with an event detection process to forward ULI to the PCC. Continuing with this example, second subscription information can correlate session event triggers with the corresponding subscribing application servers of the group of application servers so that the ULI is delivered to only those application servers that requested the particular ULI based on the particular session event trigger. The second subscription information can be stored by the PCC (e.g., PCRF 180 and/or PCEF 220) and/or IMS network. In this example, the network nodes (e.g., MME and HSS) can gather and forward ULI based on a subscribed event trigger, while the PCC and/or IMS can determine and filter which application servers (of a group of application servers that have subscribed to various event triggers) requested the ULI for the particular detected session event. Other embodiments can be used in the subject disclosure.

In one embodiment, the selective ULI reporting based on a subscription registration process can be overridden or otherwise suspended based on extenuating circumstances. For example, a PCRF can determine, such as based on the PDN-id, if an IP-CAN Session concerns an IMS emergency session. For an IP-CAN session serving an IMS emergency session, the PCRF can make authorization and policy decisions that gives higher priority to the traffic for emergency handling destinations, IMS signaling and the traffic to retrieve user location information (e.g., in the user plane) for emergency services. In this example, the reporting of ULI for general sessions may be de-prioritized where an IMS emergency session is detected.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
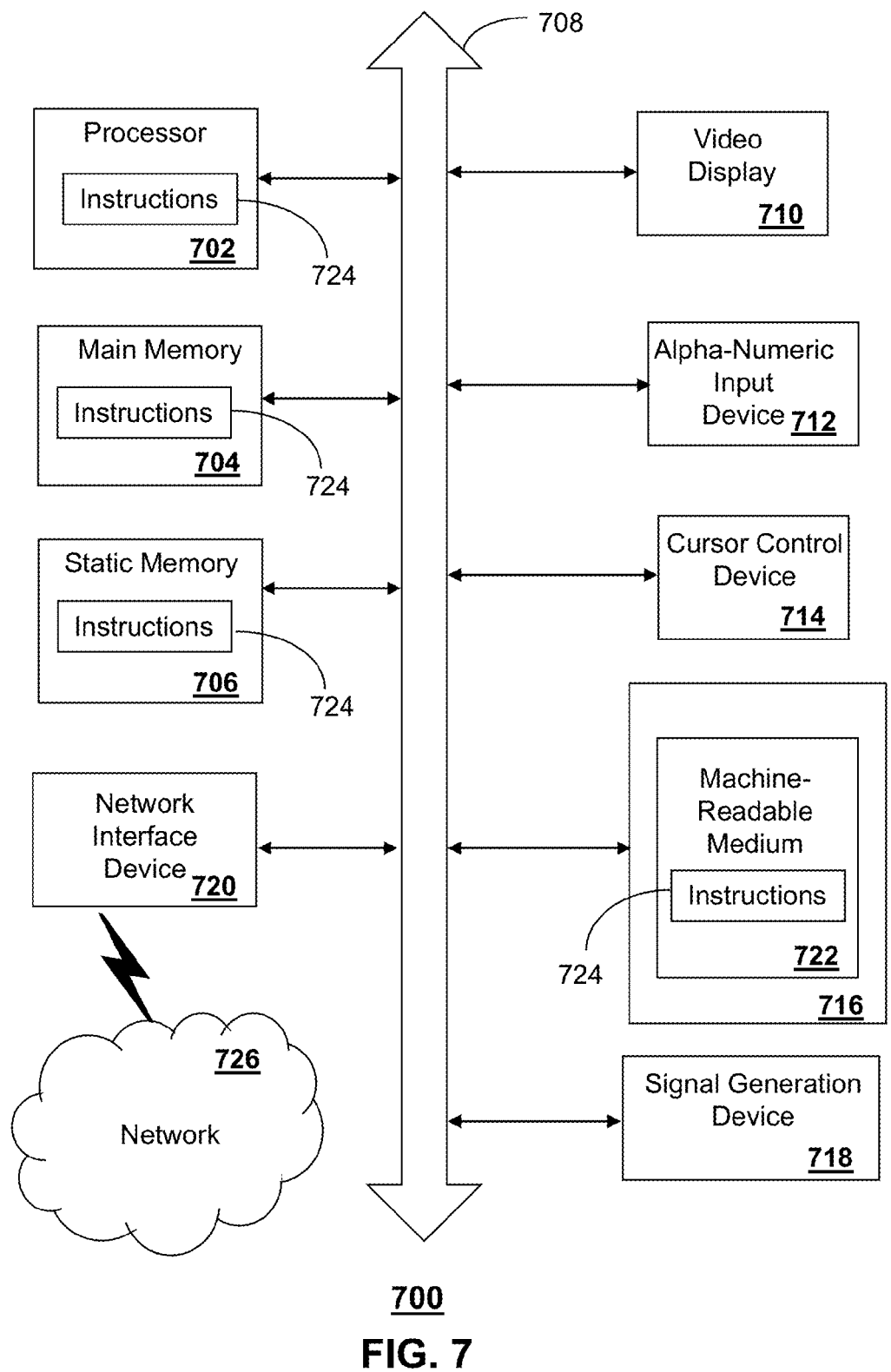
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as a PCC (e.g., the PCRF 180 and/or the PCEF 220), an MME, an HSS, an application server, a UE and other devices of FIGS. 1-2 and 5-6 to enable selective ULI reporting based on a subscription process. For example, the machine can receive a subscription from an application server, where the machine performs policy control and charging functions in a mobile communications network, and where the subscription identifies a session event occurring in a communication session for which the application server requests user location information. The machine can provide subscription information based on the subscription to core network nodes of the mobile communications network. The machine can receive user location information from the core network nodes responsive to a detection of a triggering event corresponding to the session event of the subscription. The machine can provide the user location information to an IP multimedia subsystem network for delivery to the application server, where the delivery of the user location information is limited to application servers that are subscribed to the session event, and/or only for the event/sub-event an application server has subscribed.

In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The exemplary embodiments described herein can be part of various communication systems including an Internet Protocol Television (IPTV) media system satellite and/or terrestrial communication systems. These systems can provide various services including voice video and/or data services. Multiple forms of media services can be offered to media devices (e.g., mobile communication devices, set top boxes, desk top computers, and so forth) over landline technologies. Additionally, media services can be offered to media devices by way of wireless technologies such as through use of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a processing system including a processor, a subscription from an application server, wherein the system performs policy control and charging functions in a mobile communications network, and wherein the subscription identifies a session event or sub-event occurring in a communication session for which the application server requests user location information;
providing, by the processing system, subscription information based on the subscription to core network nodes of the mobile communications network;
receiving, by the processing system, user location information from the core network nodes responsive to a detection of a triggering event or a triggering sub-event corresponding to the session event or the sub-event of the subscription;
determining, by the processing system, whether reporting of the triggering event or the triggering sub-event that is detected will not result in an undesired signal load; and
providing, by the processing system, the user location information to an IP multimedia subsystem network for delivery to the application server responsive to the determining that the reporting of the triggering event or the triggering sub-event will not result in the undesired signal load,
wherein the delivery of the user location information is limited to application servers that are subscribed to the session event or the sub-event.

2. The method of claim 1, wherein the session event is a group of session events comprising a session initiation and a session termination, and wherein the session event is not a session update caused by user mobility.

3. The method of claim 2, wherein the providing of the user location information to the IP multimedia subsystem network comprises transmitting the user location information from a policy charging and rules function server of the system to a call session control function server of the IP multimedia subsystem network.

4. The method of claim 1, wherein the session event comprises a session initiation.

5. The method of claim 1, wherein the session event comprises a session update.

6. The method of claim 1, wherein the session event comprises a session termination.

7. The method of claim 1, wherein the core network nodes comprise a mobility management entity, a home subscriber server, or a combination thereof.

8. The method of claim 1, wherein the user location information comprises a cell identification and local time information.

9. The method of claim 1, wherein the receiving of the user location information from the core network nodes comprises receiving the user location information at a policy charging and enforcement function server of the system and then providing the user location information to a policy charging and rules function server of the system.

10. A system comprising:
a memory to store executable instructions; and
a processing system comprising a processor coupled to the memory, wherein the processing system, responsive to executing the executable instructions, performs operations comprising:
performing policy control and charging functions in a mobile communications network;
receiving subscriptions from a subset of application servers of a plurality of application servers, wherein the subscriptions identify session events of a communication session for which the subset of application servers are requesting user location information;
providing subscription information based on the subscriptions to core network nodes of the mobile communications network;
receiving user location information from the core network nodes responsive to detection of triggering events that correspond to the session events of the subscriptions;
determining whether reporting of the triggering events that are detected will not result in an undesired signal load; and
providing, responsive to the determining that the reporting of the triggering events that are detected will not result in the undesired signal load, the user location information to an IP multimedia subsystem network for delivery to the subset of application servers without delivery to remaining application servers of the plurality of application servers that did not subscribe to the session events, wherein delivery of the user location information is for only subscribed event or sub-events without delivery of unsubscribed events or sub-events.

11. The system of claim 10, wherein the session events comprise a session initiation and a session termination, and wherein the session events do not include a session update caused by user mobility.

12. The system of claim 10, wherein the session events comprise a session update.

13. The system of claim 10, wherein the session events comprise a session initiation, a session termination, or a combination thereof.

14. The system of claim 10, wherein the core network nodes comprise a mobility management entity.

15. The system of claim 10, wherein the core network nodes comprise a home subscriber server.

16. The system of claim 10, wherein the providing of the user location information to the IP multimedia subsystem network comprises transmitting the user location information from a policy charging and rules function server of the system to a call session control function server of the IP multimedia subsystem network, and wherein the receiving of the user location information from the core network nodes comprises receiving the user location information at a policy charging and enforcement function server of the system and then providing the user location information to the policy charging and rules function server.

17. An application server comprising:
a memory to store executable instructions; and
a processing system including a processor coupled to the memory, wherein the processing system, responsive to executing the executable instructions, performs operations comprising:
providing a subscription to a system that performs policy control and charging functions in a mobile communications network, wherein the subscription identifies a first session event or sub-event for which the application server is requesting first user location information of a communication session; and receiving, from an IP multimedia subsystem network, the first user location information of the communication session responsive to a detection of a first triggering event corresponding to the first session event or sub-event of the subscription, wherein the processor does not receive second user location information of the communication session when a detection of a second triggering event occurs, wherein the second triggering event corresponds to a second session event or sub-event of the communication session for which the application server is not subscribed, and wherein the first triggering event is not received if the IP multimedia subsystem network determines that reporting of the first triggering event will result in an undesired signal load.

18. The application server of claim 17, wherein the operations further comprise generating billing records based on the first user location information.

19. The application server of claim 17, wherein the operations further comprise monitoring network performance and problem trouble shooting based on the first user location information.

20. The application server of claim 17, wherein the operations further comprise enabling IP multimedia media services based on the user location information.

* * * * *